United States Patent
Dahlén et al.

(10) Patent No.: US 10,526,141 B2
(45) Date of Patent: Jan. 7, 2020

(54) METHOD FOR POSITIONING LOAD AND FETCHING POSITIONED LOAD OR STACKING LOADS WITH CRANE

(75) Inventors: Justus Dahlén, Espoo (FI); Hannu Lindfors, Järvenpää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 1089 days.

(21) Appl. No.: 13/990,980

(22) PCT Filed: Dec. 1, 2011

(86) PCT No.: PCT/FI2011/051068
§ 371 (c)(1),
(2), (4) Date: May 31, 2013

(87) PCT Pub. No.: WO2012/072885
PCT Pub. Date: Jun. 7, 2012

(65) Prior Publication Data
US 2013/0251498 A1 Sep. 26, 2013

(30) Foreign Application Priority Data
Dec. 3, 2010 (FI) ..................................... 20106285

(51) Int. Cl.
*B65G 1/04* (2006.01)
*B66C 13/48* (2006.01)

(52) U.S. Cl.
CPC ............ *B65G 1/0421* (2013.01); *B66C 13/48* (2013.01)

(58) Field of Classification Search
CPC ........ B65G 1/0421; B66C 13/40; B66C 13/48

USPC .......................................... 414/802; 700/214
See application file for complete search history.

(56) References Cited

U.S. PATENT DOCUMENTS

| | | | |
|---|---|---|---|
| 4,642,017 A * | 2/1987 | Fenn | .............................. 414/348 |
| 4,753,357 A * | 6/1988 | Miyoshi | .................. B66C 13/46 |
| | | | 212/286 |
| 4,796,209 A | 1/1989 | Burk | |

(Continued)

FOREIGN PATENT DOCUMENTS

| CN | 2663387 Y | 12/2004 |
|---|---|---|
| EP | 2 560 914 A1 | 2/2013 |

(Continued)

*Primary Examiner* — Lynn E Schwenning
(74) *Attorney, Agent, or Firm* — Birch, Stewart, Kolasch & Birch, LLP

(57) ABSTRACT

A method positions a load and fetches a positioned load or stacks loads with a crane having location measurement arranged thereto. The method includes taking a load to a selected position; detecting the unloading of the load mainly automatically; storing coordinate information of the load position mainly automatically into the memory of the crane or its control; when fetching a load or adding loads to a stack, activating, at a selected first time instant, a positioning switch arranged in the crane and connected to the memory, whereby coordinates of a load or stack most advantageously positioned relative to the movement of the crane are selected, after which the crane begins to move to said coordinates; and then hoisting or lowering the load at the selected coordinates, and at a selected second time instant, deleting the coordinate information associated with the position of the load from the memory.

15 Claims, 3 Drawing Sheets

(56) References Cited

U.S. PATENT DOCUMENTS

Figure 1:
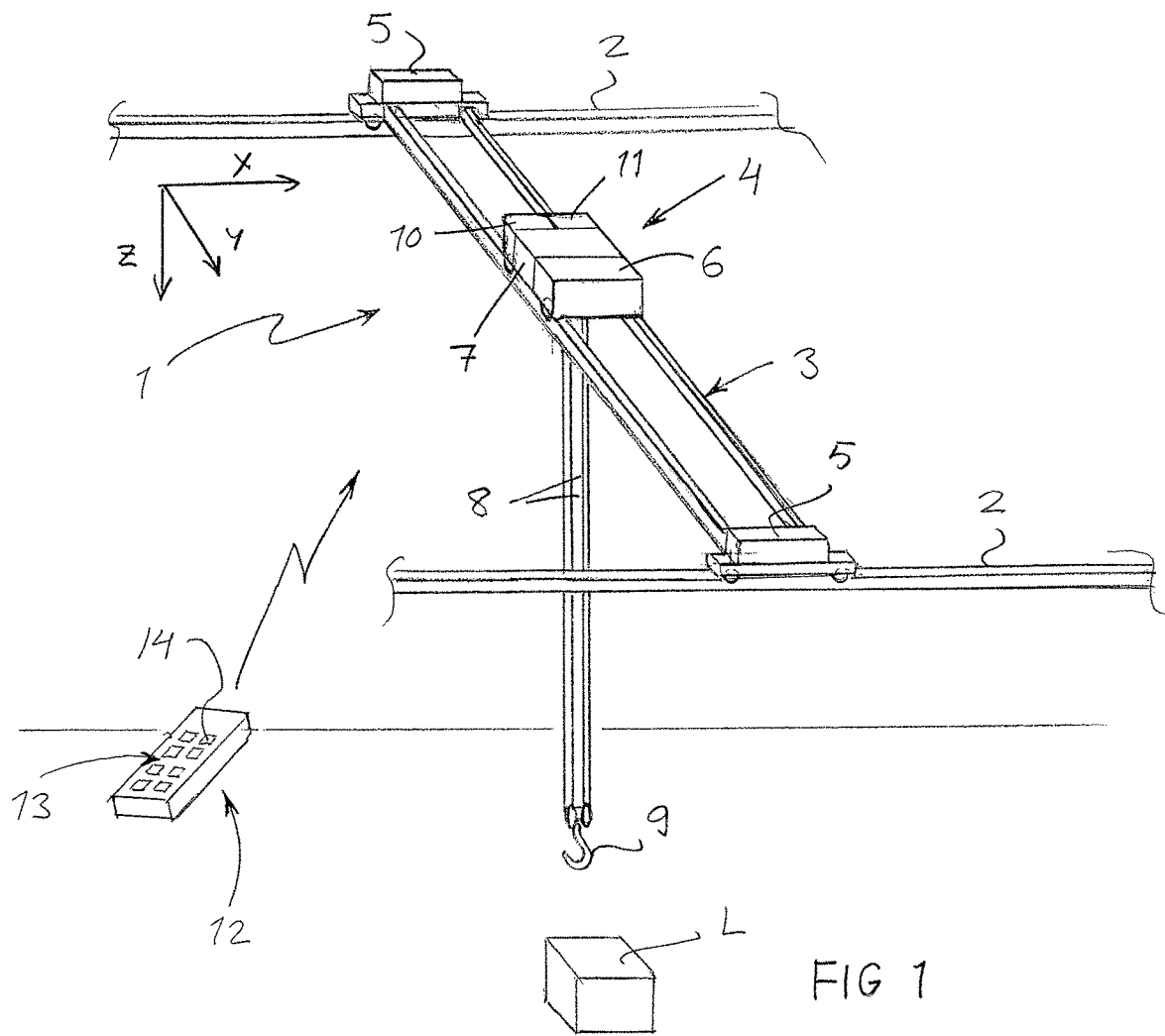

| | | | |
|---|---|---|---|
| 5,141,381 A * | 8/1992 | Kato | B65G 1/0421 340/644 |
| 6,193,086 B1 * | 2/2001 | Gunnlaugsson | B66C 13/56 212/290 |
| 7,344,037 B1 | 3/2008 | Zakula, Sr. et al. | |
| 7,547,173 B2 * | 6/2009 | Jung | 414/139.9 |
| 2003/0190057 A1 | 10/2003 | Takehara et al. | |
| 2007/0222674 A1 | 9/2007 | Tan et al. | |
| 2011/0062104 A1 * | 3/2011 | Schneider et al. | 212/276 |
| 2012/0143446 A1 * | 6/2012 | Tushaus | 701/50 |
| 2012/0271582 A1 * | 10/2012 | Bageshwar | B66C 13/46 702/92 |
| 2013/0041500 A1 * | 2/2013 | Dahlen | 700/215 |

FOREIGN PATENT DOCUMENTS

| | | | |
|---|---|---|---|
| GB | 2353515 A | 2/2001 | |
| JP | 62-96228 A | 5/1987 | |
| JP | 64-60595 A | 3/1989 | |
| JP | 10-236771 A | 9/1998 | |
| JP | 11-79659 A | 3/1999 | |
| JP | 2000-247574 A | 9/2000 | |
| JP | 2000-255978 A | 9/2000 | |
| KR | 10-0344102 B1 | 11/2002 | |
| KR | 10-2010-0107807 A | 10/2010 | |
| WO | WO 02/42881 A2 | 5/2002 | |
| WO | WO 02/042881 A3 | 5/2002 | |
| WO | WO 2011/131836 A1 | 10/2011 | |

\* cited by examiner

METHOD FOR POSITIONING LOAD AND FETCHING POSITIONED LOAD OR STACKING LOADS WITH CRANE

BACKGROUND OF THE INVENTION

The invention relates to a method for positioning a load and fetching a positioned load or stacking loads with a crane having location measurement arranged therein, the method comprising taking the load to a selected position, detecting the unloading of the load, storing the required coordinate information of the position of the load into the memory of the crane or its control, and repeating the above-mentioned actions as required.

Publication GB 2 353 515 A discloses a method and apparatus, in which the hoisting member of a crane can be controlled along a predefined track to a desired location. For this, the apparatus has angle sensors, a load sensor, and automatic control to which the coordinates or distance of the location of the load or destination can be set in advance and which then controls the hoisting action.

Publication JP 1060595 A discloses a method with which a crane can be positioned on top of a load to be fetched by using information collected when leaving the load and consisting of the travel speeds of different crane paths and the winding speeds of the hoisting machinery.

Publication JP 10236771 A examines preventing the sending of faulty position signals in hoisting apparatuses that use load location storage and utilization of location information when fetching the load.

Publication JP 100344102 A discloses means for measuring the movements of a crane and the distances between a hoisting device and its load and for storing said information into memory for later use.

Publications JP 2000247574 A and JP 62096228 also discuss the use of stored information concerning load processing and the prevention of possible errors when using this information.

Precise positioning of the hoisting member of a crane at a desired position is often relatively time-consuming and positioning exactly above the centre of mass of the load is challenging, as the load must not swing when it is hoisted. Similarly, the estimation of the load that is easiest to fetch from a storage of similar or equivalent loads is quite difficult.

This objective cannot be achieved in a satisfactory manner by using the prior art.

SUMMARY OF THE INVENTION

The purpose of the present invention is to start from the prior art described above, wherein the crane contains among other things location measurement, and to provide a method with which the hoisting member of the crane is effortlessly and quickly brought above the load at the most advantageous position, and to hoist the load fastened to the hoisting member without diagonal pull and the ensuing swing.

An object of the invention is to develop the method described in the beginning in such a manner that the aforementioned problems are solved. This object is achieved by a method of the invention that is characterised by detecting the detachment of a load, which means leaving the load, mainly automatically; storing the coordinate information of the leaving position of the load mainly automatically into the memory of the crane or its control; when fetching a load or adding loads to a stack, activating at a first selected time instant a positioning switch arranged to the crane and connected to said memory, whereby the coordinates of the load that is at the most advantageous position relative to the movement of the crane are selected, after which the crane begins to move to these coordinates; and then hoisting or lowering the load at the selected coordinates; and removing at a selected time instant the coordinate information related to the position of the hoisted load from the memory.

The invention is based on the fact that the coordinate information of left loads are stored automatically, and that the crane is driven to the position of the desired loads thus recorded into memory as precise coordinates by means of the positioning switch, whereby the subsequent fastening of the loading member to the load and the hoisting of the load takes place precisely and easily, because the reverse action has been specified into the memory.

In practice, the coordinates of the hoisting member of the crane are most preferably identified during detaching the load. Thus, when fetching the load, the hoisting member of the crane is controlled precisely by using the positioning switch to the position where it detached when leaving the load, and the subsequent hoisting of the load will take place easily and without swinging. The attachment of the hoisting member to the load may also be automated.

The detachment of the load and the beginning of the load hoist can be detected by monitoring the load information, in which case the detachment and fastening of the load are detected by means of a certain load limit value. The same things can also be observed by sensors of the hoisting member, such as mechanical switches, optical sensors or low-pressure sensors.

If necessary, in some special cases the detection of the load detachment and the storing into memory of the detached load coordinate information can also be done or must also be possible manually. This may be necessary, if there are problems in detaching the hoisting member from the load, for instance.

When fetching a load, the load most advantageously positioned relative to the movement of the crane is generally the closest load. It is also possible to select as the target load the one that can be reached the quickest, which is not necessarily always the closest load, if the crane is already under way in a direction that is not advantageous in relation to the closest load. The load that is located most advantageously may also be the load reached with the lowest energy consumption, and it may naturally also be the closest load and/or the one reached the quickest.

The positioning switch may be arranged such that when it is pressed once, the crane moves to the load to be hoisted in one go, or if necessary, a manual function may be added to the switch, whereby the movement of the crane stops when the manual use of the positioning switch is stopped.

If necessary, the operation of the positioning switch may be arranged to have at least two steps, in which case the first step implements the substantially horizontal crane movements according to the x and y coordinates and the second step implements the vertical movement according to the z coordinate.

The operating radius of positioning may also be limited, whereby the crane moves to the most advantageous position only when this position is closer than a predefined distance.

LIST OF FIGURES

Figure 2:
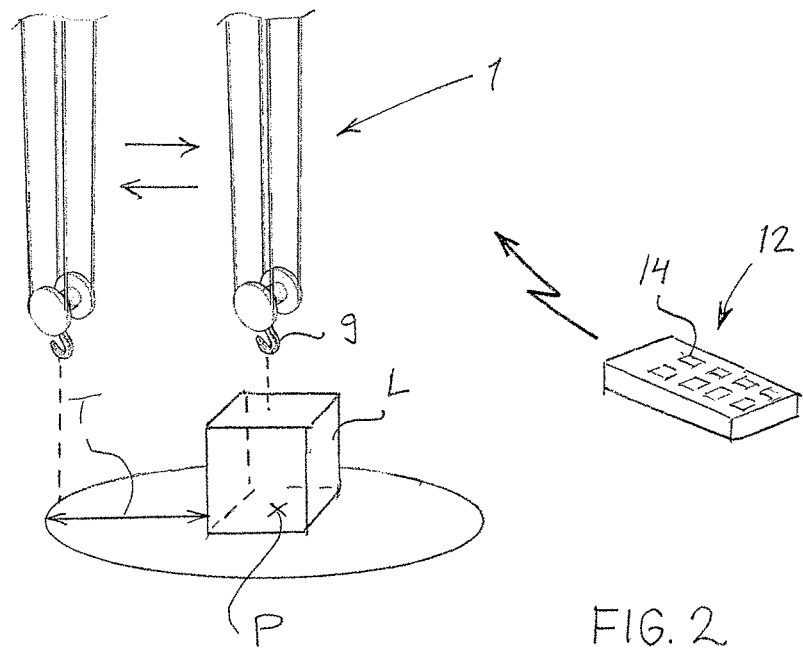
Figure 3:
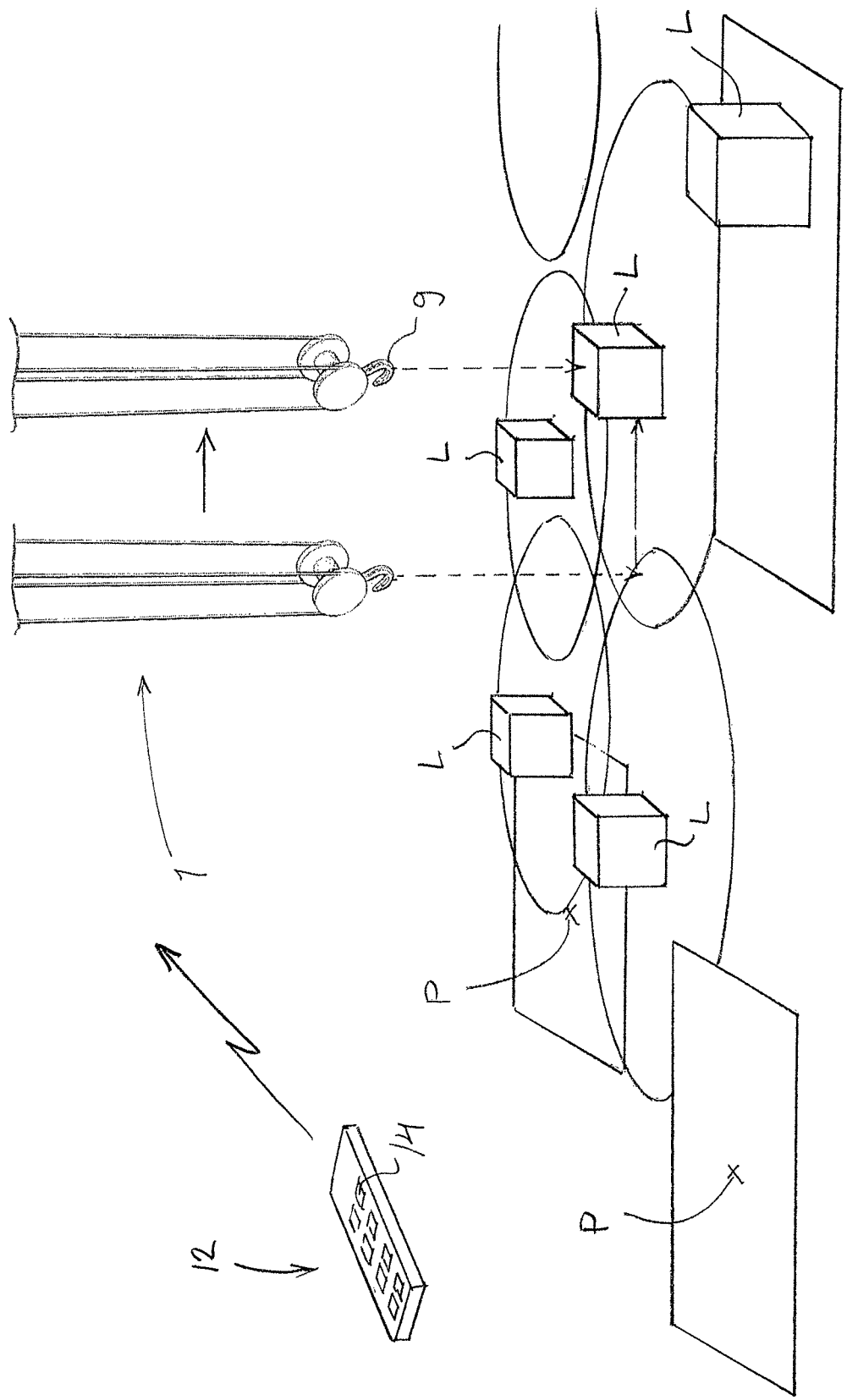
Figure 4:
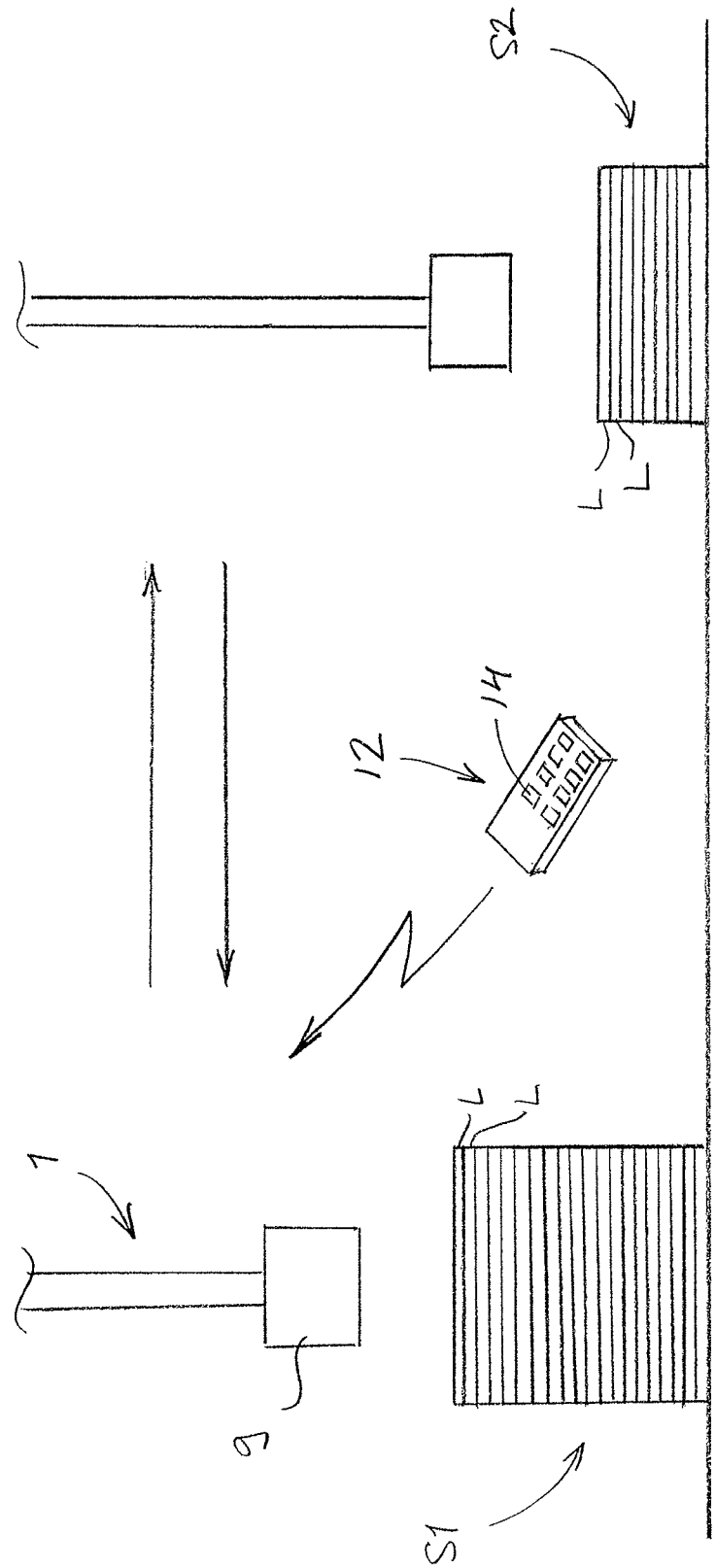

The invention will now be described by way of example in simplified diagrams with reference to the attached drawings, in which FIG. 1 is a simplified diagram of a crane system used in implementing the method of the invention;

FIG. 2 shows the leaving of a load;
FIG. 3 shows the fetching of a load; and
FIG. 4 shows stacking loads on top of each other.

DETAILED DESCRIPTION OF THE INVENTION

FIG. 1 shows a crane system used in implementing the invention, which is this example case is a bridge crane 1 well-suited for this purpose. This bridge crane 1 comprises a lifting bridge 3 that moves along two rails 2 located at a distance from each other, along which lifting bridge a trolley 4 is, in turn, arranged to move transversely to the rails 2. At the ends of the lifting bridge 3 and in the trolley 4, there are moving mechanisms 5 and 6 of the crane for moving the trolley 4 in x and y directions. The trolley 4 has a hoisting mechanism 7 of the crane that may comprise for instance hoisting tackle 8 and a hoisting hook 9 or the like serving as the hoisting member. The crane 1 also has operational control 10 and a memory 11. The memory 11 may naturally also be separate from the crane 1. The positioning and fetching of loads L may be controlled either directly from the crane 1 or via a remote controller 12 that contains all control members 13 (such as push buttons, joy stick, etc.) associated with the use of the crane 1 and a positioning switch 14 of the invention.

The operation of the crane 1 according to the invention and related especially to FIGS. 1 to 3, which may be referred to as dynamic positioning, requires that location measurement be arranged in the crane 1 to determine the location of the hoisting hook 9 in the space where the crane 1 moves. This is generally done by measuring the location of the lifting bridge 3 and trolley 4 in their area of movement by using laser-based distance measurement devices, for instance, and the location of the hoisting hook 9 by using a pulse sensor at the end of one of the hoisting mechanism 7 axles. These measures form a coordinate system, in which the location of the hoisting hook 9 may be determined in the future. In the following, the x coordinate refers to the location of the lifting bridge 3, the y coordinate to the location of the trolley 4, and the z coordinate to the location of the hoisting hook 9.

Dynamic positioning operates in such a manner that when a load is taken to a selected position, the crane 1 automatically detects the leaving of the load L, that is, its detachment from the hoisting hook 9, stores the coordinate information x, y, z of the leaving position of the load L into the memory 11 of the crane 1 or its control 10 as a destination point P. When fetching a load L, at a selected time instant the positioning switch 14 arranged in the crane 1 or remote controller 12 and connected to the memory 11 is activated, whereby the coordinates of the load L most advantageously located relative to the movement of the crane 1, usually the closest load, are selected from the memory 11. Then the crane 1 (trolley 4) immediately begins to move to the coordinates and lowers the hoisting hook 9 at the position of the coordinates where it earlier detached from the load L during unloading. After this, it is easy to hoist the load L. When hoisting the load L, the crane 1 detects that the load L is hoisted and deletes this closest destination point P, that is, its coordinate information x, y, x from the memory 11, after the load L moves beyond specified tolerances T of the destination point, for example. If required, the destination point P may be deleted manually, as described later in connection with an example.

Leaving the load L and fetching or hoisting it may be monitored at least in the following ways or combinations thereof:
1. By monitoring the load information of the crane 1 for instance as follows
   a. When the load decreases below a given value/exceeds a given limit value
   b. When the load increases/decreases by a certain amount
2. By using a sensor in the hoisting member 9 for instance as follows
   a. Using in the hoisting member 9 a mechanical switch that activates when a load L is hoisted
   b. Using an optical sensor that detects that a load L is hoisted
   c. If the hoisting member is a low pressure gripper, by monitoring its low pressure.
3. By a signal from a user who presses a button arranged for this purpose. The button may be a positioning button 14 that is then pressed in a specific manner.

As already stated earlier, when fetching a load L, the load L most advantageously positioned relative to the movement of the crane 1 is generally the closest load L. It is also possible to select as a target load L, the one that can be reached the quickest, which is not necessarily always the closest load L, if the crane 1 is already under way in a direction that is not advantageous in relation to the closest load L. The load L that is located most advantageously may also be the load L reached with the lowest energy consumption of the crane 1, and it may naturally also be the closest load L and/or the one reached the quickest.

The positioning switch 14 may be arranged such that when it is pressed once, the crane 1 (trolley 4) moves to the load L to be hoisted in one go, or if necessary, a manual function may be added to the switch 14, whereby the movement of the crane 1 stops when the manual use of the positioning switch 14 is stopped.

The operation of the positioning switch 14 may also be arranged to have two steps, in which case the first step implements the horizontal movements of the crane 1 in accordance with the x and y coordinates and the second step implements the vertical movement according to the z coordinate (if driving in the z coordinate direction is taken into use).

The coordinate information x, y, z of the loads L may also be distributed to several cranes 1 (trolleys 4), whereby the load L may be fetched with a different crane (trolley 4) than that which brought the load L to the position P corresponding to the coordinate information. In the case of using several cranes 1 (trolleys 4), the destination points may also be kept separate for each crane 1 (trolley 4) and activated only when said cranes 1 (trolleys 4) have been selected for use.

The method of the invention is, as shown in FIG. 4, also suited for use in which loads L are to be stacked on top of each other, whereby the loads L can be positioned relatively precisely on top of each other, for instance when sheets are shifted from one stack S1 to another S2. The crane 1 is then run close to the first stack S1 and the positioning button 14 pressed, whereby the crane 1 moves above the stack S1; next, a sheet (load L) is grabbed and the crane moved close to the second stack S2 and the positioning button 14 pressed, whereby the crane 1 moves above the stack S2. In the case of FIG. 4, the hoisting member 9 of the crane 1 is shown as a low-pressure gripper.

In certain cases, when loads L are stacked on top of each other as shown in FIG. 4, and several loads L are brought and fetched at a time, it is possible to keep a record of the load amount of the destination point and delete the point manually only after all loads L (the entire load) has been taken away.

In situations where a new destination point would be closer than a predefined value, the destination point should be processed in an appropriate manner depending on the application. For instance, it is possible to delete the original destination point from the memory and add a new destination point in it, or use the positioning information of the new or the old point or a combination thereof for both points.

If the load brought to the area by the crane 1 is moved away using another device, a phantom point may be created with no load L. The operator of the crane 1 can then be given the possibility of deleting the destination point P from the memory 11 by pressing the positioning button 14 in a certain manner, for instance by pressing it several times in succession and for a certain length of time.

The positioning of the invention may also be set limitations, such as prohibited or protected areas, where the crane 1 or its hoisting member 9 may not move without special measures. The operating radius of positioning may also be limited, whereby the crane 1 moves to the most advantageous point P only when this position is closer than a predefined distance.

Positioning in the coordinates associated with a selected point takes place substantially horizontally, and depending on the application, there may be various lowering movements during the positioning: no automatic lowering; lowering when the target has been reached in the horizontal direction (the horizontal movement of the crane has, in practice, stopped or is stopping); or lowering is activated when the crane is sufficiently close to the target, which saves time and makes the crane movements smooth.

The selected point and the coordinate information associated with it may also be defined in other ways than by fastening/releasing the load L. The user may define selected locations having fixed positions from a selected point of the production line or work cell, for instance. In addition to this, a higher level system, such as a production control system, may provide definitions for selected points along the production line. The production line may proceed stepwise according to the work cell (one or more steps at a time) or it may be a continuous line, such as a car manufacturing line. This way, the selected point may be moved relative to the geographical coordinate system and still the selected point, for example an assembled product, such as the chassis of a car or a jig used in fastening it, may be kept the same alignment-wise. In this example, the car or jig is fastened to a moving coordinate system, and the moving coordinate system moves relative to the geographical coordinate system. The control system of the crane detects or receives information on the position and movement of the moving coordinate system relative to the geographical coordinate system.

The above description of the invention is only intended to illustrate the basic idea of the invention. A person skilled in the art may thus vary its details within the scope of the accompanying claims. Thus, any crane suitable for the purpose can be used instead of the now described bridge crane.

The invention claimed is:

1. A method for positioning a load and fetching a positioned load or stacking loads with a crane having location measurement arranged thereto, the method comprising:
    taking a load to a selected position;
    detecting the unloading of the load by detecting detachment of the load;
    storing the required coordinate information of the position of the load in a memory of the crane or its control;
    when fetching a positioned load or adding loads to a stack, activating, at a first time instant, by pressing a positioning switch, which is a pressable switch, arranged in the crane and connected to the memory, whereby the coordinates of the positioned load or a stack most advantageously located relative to the movement of the crane are selected from the memory, after which the crane begins to move to these coordinates; and then
    lifting or lowering the load at the selected coordinates, and
    deleting, at a second time instant, from the memory previous coordinate information associated with the lifted load.

2. The method as claimed in claim 1, wherein the coordinate information of the unloading point of the load includes at least one of horizontal coordinates or a vertical coordinate.

3. The method as claimed in claim 1, further comprising detecting the coordinates of a hoisting member of the crane when a load is detached.

4. The method as claimed in claim 1, wherein detecting the detachment of the load includes monitoring the load information of the crane, in which case the detachment of the load is detected when the load is below a certain load limit value.

5. The method as claimed in claim 1, wherein detecting the detachment of the load includes using sensors in the hoisting member.

6. The method as claimed in claim 1, wherein, when fetching a load, the load most advantageously positioned relative to the movement of the crane is the closest load.

7. The method as claimed in claim 6, wherein, when fetching a load, the load most advantageously positioned relative to the movement of the crane is the load that is reached the quickest.

8. The method as claimed in claim 6, wherein, when fetching a load, the load most advantageously positioned relative to the movement of the crane is the load that is reached with the lowest energy consumption of the crane.

9. The method as claimed in claim 1, wherein when activating the positioning switch, the crane moves automatically to the selected load for hoisting the load.

10. The method as claimed in claim 9, wherein when arriving at the load selected for hoisting, the hoisting member of the crane is automatically directed to grab the load to be hoisted.

11. The method as claimed in claim 1, wherein the positioning switch is continuously kept active manually, in which case the movement of the crane stops when the manual use of the positioning switch is stopped.

12. The method as claimed in claim 11, wherein the operation of the positioning switch is arranged to have at least two steps, in which case the first step implements the substantially horizontal movements of the crane according to the x and y coordinates and the second step implements the vertical movement according to the z coordinate.

13. The method as claimed in claim 1, further comprising detecting grabbing and hoisting of the load by monitoring the load information of the crane, in which case the hoisting of the load is detected when a certain load limit value is exceeded.

14. The method as claimed in claim 1, further comprising detecting grabbing and hoisting of the load by using sensors in the hoisting member.

15. The method as claimed in claim 1, further comprising distributing the coordinate information of the loads to several cranes, whereby the load may be fetched with a different crane than that which brought the load to the position corresponding to the coordinate information.

* * * * *